Figure 1:
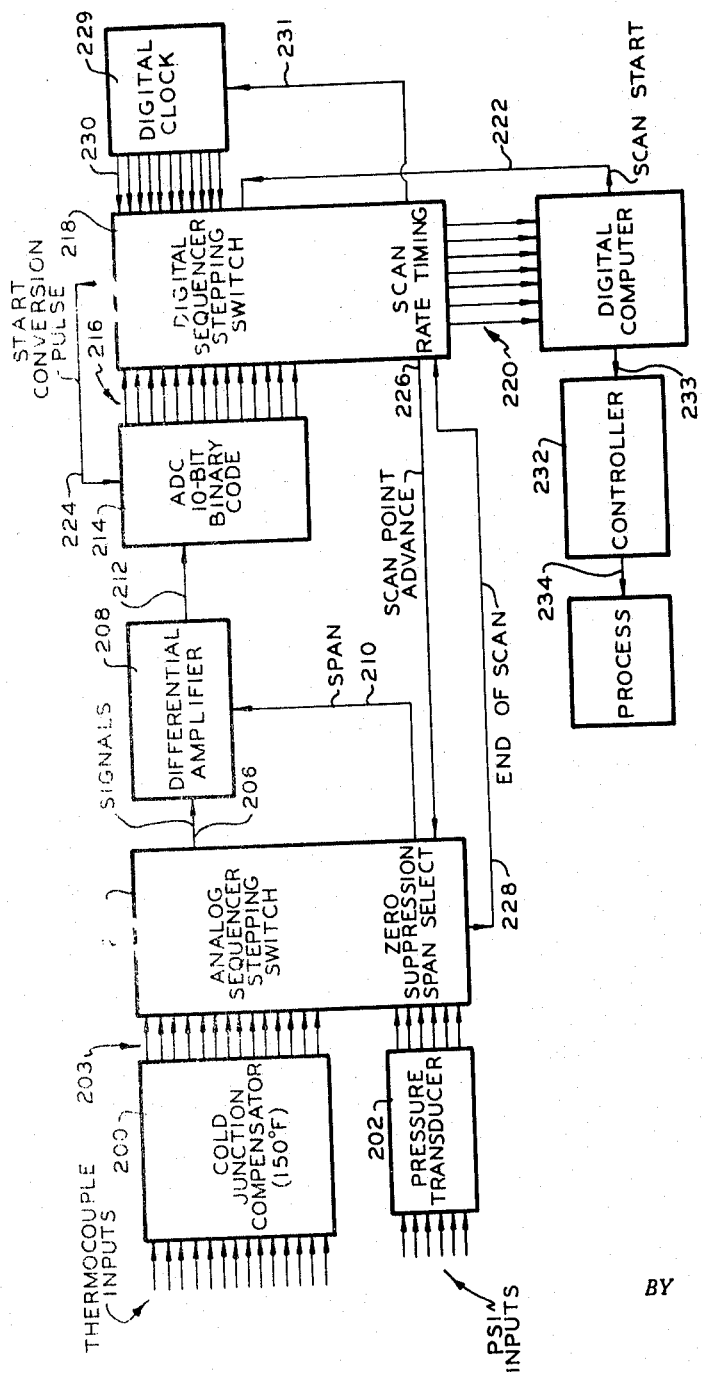

INVENTOR.
D.A. FLUEGEL

BY *Hudson & Young*

ATTORNEYS

INVENTOR.
D. A. FLUEGEL
BY Hudson + Young
ATTORNEYS

INVENTOR.
D.A. FLUEGEL

INVENTOR.
D. A. FLUEGEL
BY Hudson + Young
ATTORNEYS

INVENTOR.
D.A. FLUEGEL

INVENTOR.
D. A. FLUEGEL

BY Hudson & Young

ATTORNEYS

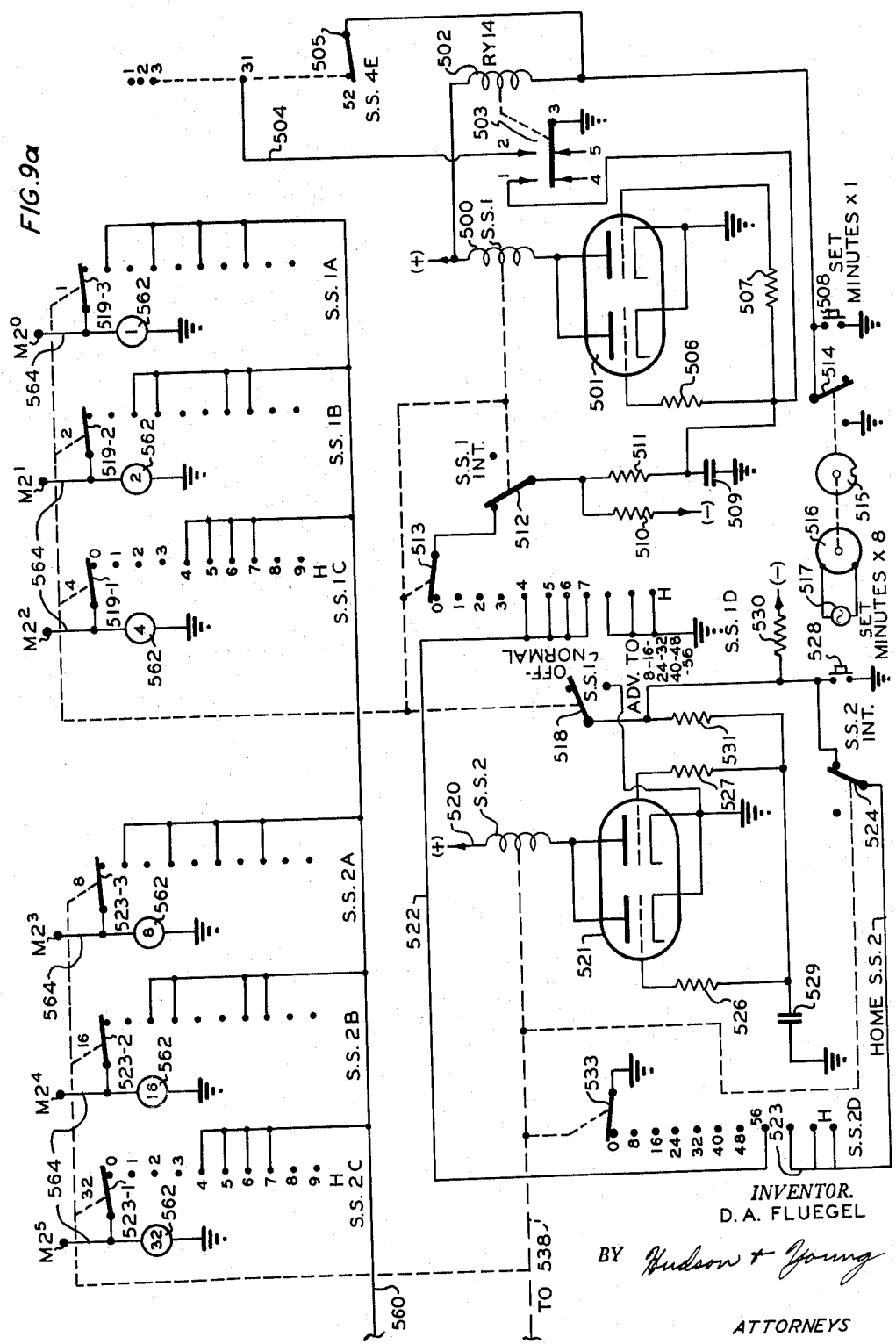

INVENTOR.
D. A. FLUEGEL
BY Hudson + Young
ATTORNEYS

United States Patent Office 3,260,998
Patented July 12, 1966

3,260,998
DIGITAL COMPUTER MEASUREMENT AND CONTROL OF ANALOG PROCESSES
Dale A. Fluegel, Bartlesville, Okla., assignor to Phillips Petroleum Company, a corporation of Delaware
Filed Oct. 25, 1961, Ser. No. 147,658
5 Claims. (Cl. 340—172.5)

This invention relates to a method of and apparatus for collecting process data for, and transmitting signals from, a digital computer.

When a digital computer is employed to control a process, process data must be supplied in a form compatible with the digital computer input requirements. Process data, in analog form, must be scanned, zero suppressed, amplified, converted to digital form and sequenced into the computer input register. The equipment employed to perform these functions is referred to as a digital computer data collection system.

A digital transmission system, as herein employed, is defined as a means whereby the electrical output signals of the digital computers are transformed into pneumatic signals utilized to adjust the process variables.

When, for example, it is desired to control a thermal cracking process by employing a digital computer, it is necessary to translate a number of variable process measurements into coded digital signals whose form and timing are compatible with the digital computer's input characteristics. An overall arrangement of apparatus for the thermally cracking and otherwise treating hydrocarbon materials is disclosed in U.S. 2,876,865 to J. R. Cobb, issued March 10, 1959. In the control of a thermal cracking process, multiple temperature and pressure measurements are continuously collected, mathematically correlated by the digital computer, and significant events and correlations are chosen by the computer, and applied to control the thermal cracking process. The characteristics of the digital computer are such as to require all input data to be converted to discrete values (digital words). Thus, the pressure measurements must be transduced and the resulting electrical temperature and pressure measurements zero suppressed, amplified, converted to digital form, and sequenced into the digital computer input register.

Various types of digital computers are well known and are commercially available. This application is concerned with the input signals transmitted to a digital computer and the output signals transmitted from the digital computer only and the discussion hereinafter, as pertains to the operation of the digital computer, will be limited thereto. A computer construction, the circuits involved, and the phenomena of operation are described in British Patent 749,836, published June 6, 1956, to Remington Rand, Inc., on what is known as the "Univac." Various other types of circuits suitable for use in digital computers, and the manner in which they operate, are set forth in Milman et al., infra (Chapter 13). Other circuits which may be employed in the digital computations are described in Engineering Research Associates "High Speed Computing Devices," McGraw-Hill, New York (1950), particularly in Chapter 13 thereof. For digital computer computations involving the process control of a thermal cracking furnace, attention is directed to a co-pending application Serial No. 66,119, filed October 31, 1960, by A. J. Andrews.

When a digital computer is used to control the operation of a thermal cracking furnace, it is desirable in order to effectuate the control to utilize the electrical signals transmitted by the digital computer to adjust the set point of conventional pneumatic controllers. Therefore, it is desirable that a means should be provided for translating the electrical output signals from the digital computer into suitable set point signals of a pneumatic nature.

Accordingly, an object of my invention is to provide a method of and apparatus for selecting process data and transmitting said process data to a digital computer.

Another object of my invention is to provide a method of and apparatus for translating the electrical output signals of a digital computer into appropriate pneumatic control signals.

Other objects, advantages and features of my invention are readily apparent from the following disclosure and the appended claims.

Figure 2:
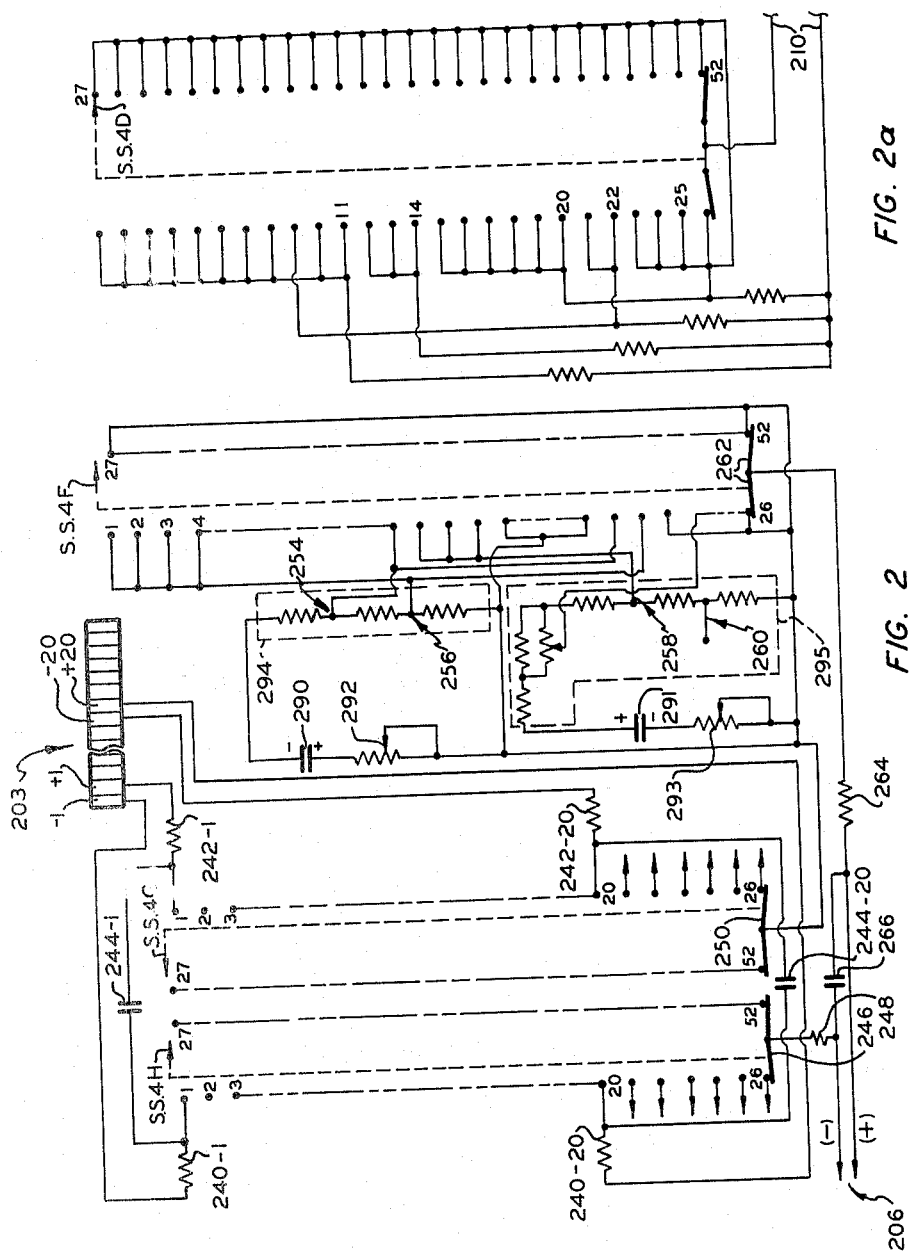
Figure 3:
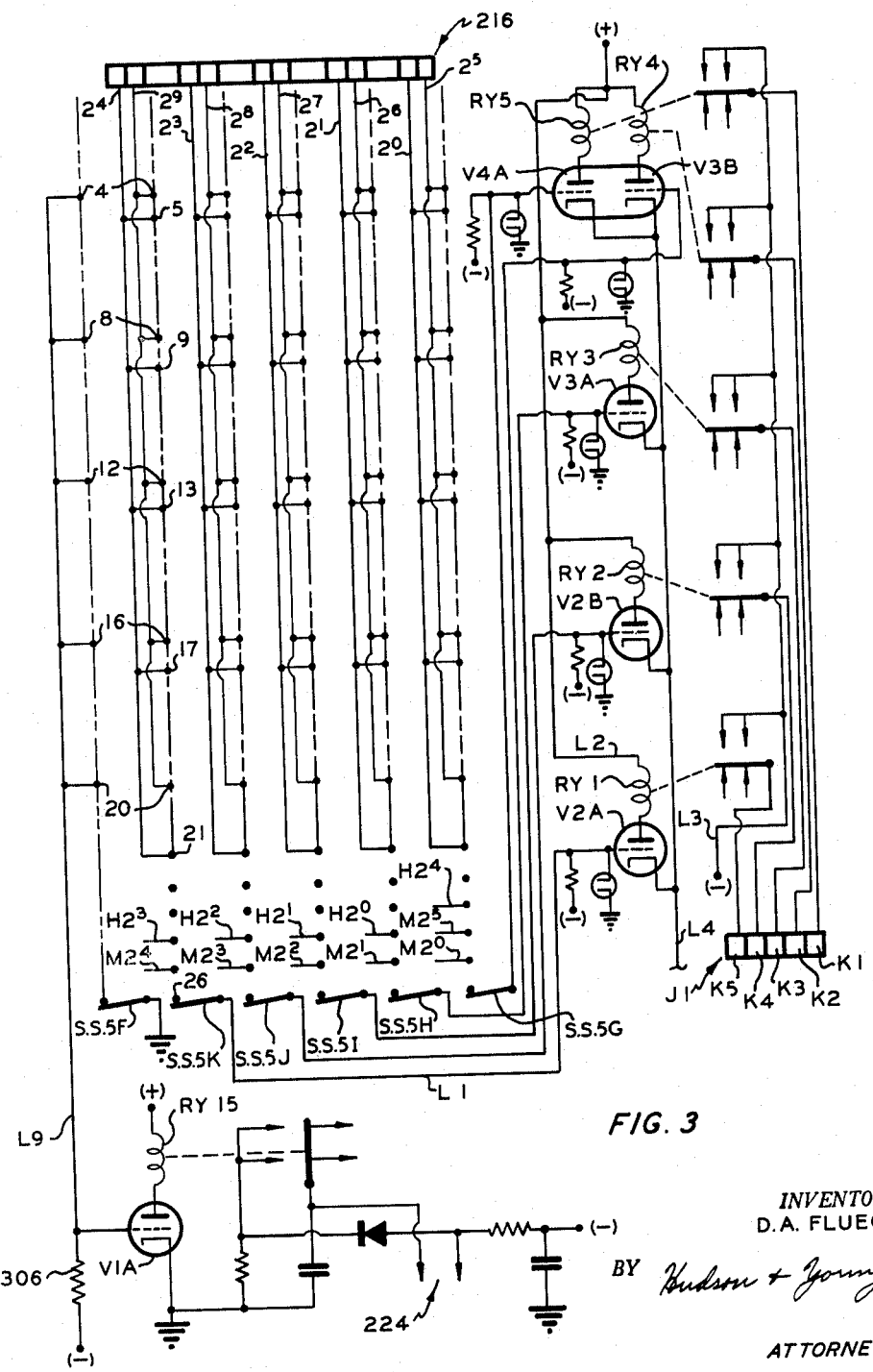
Figure 4:
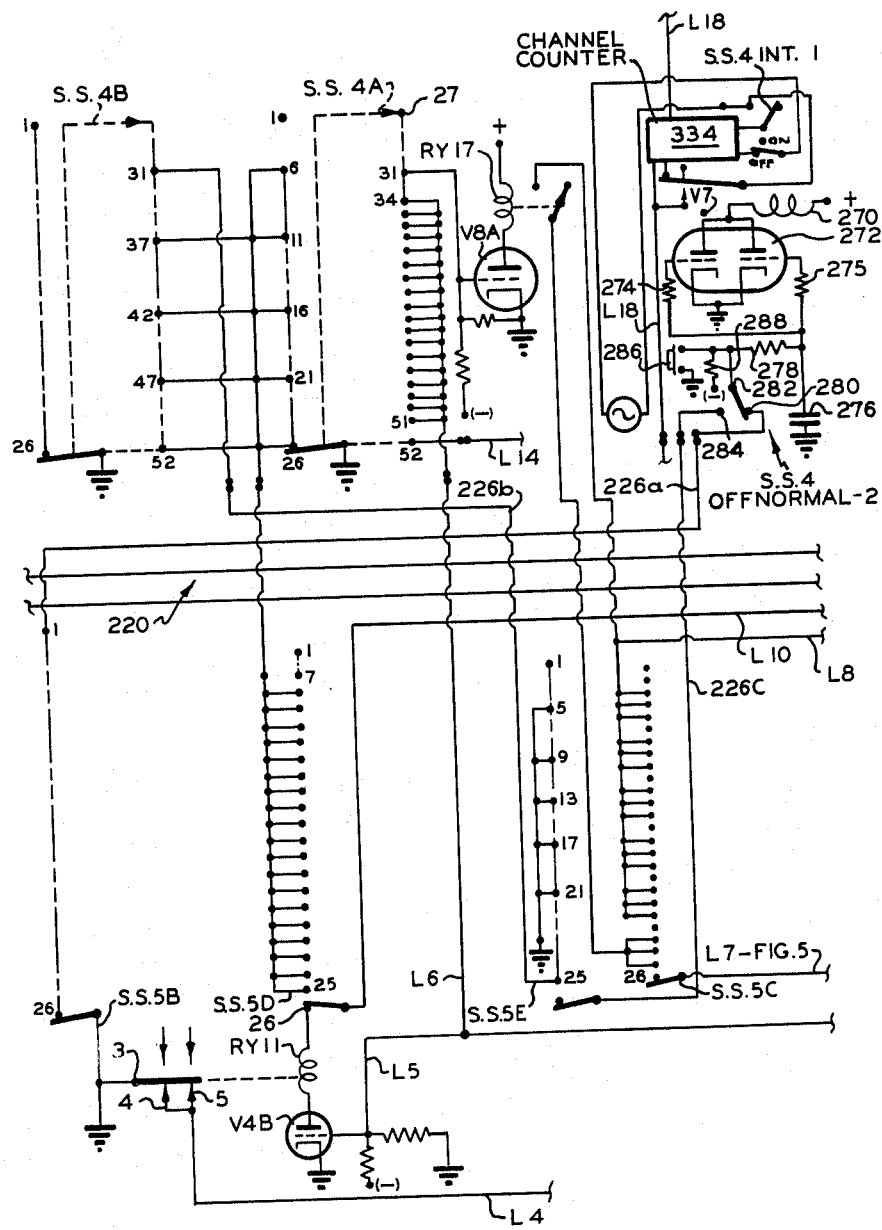
Figure 5:
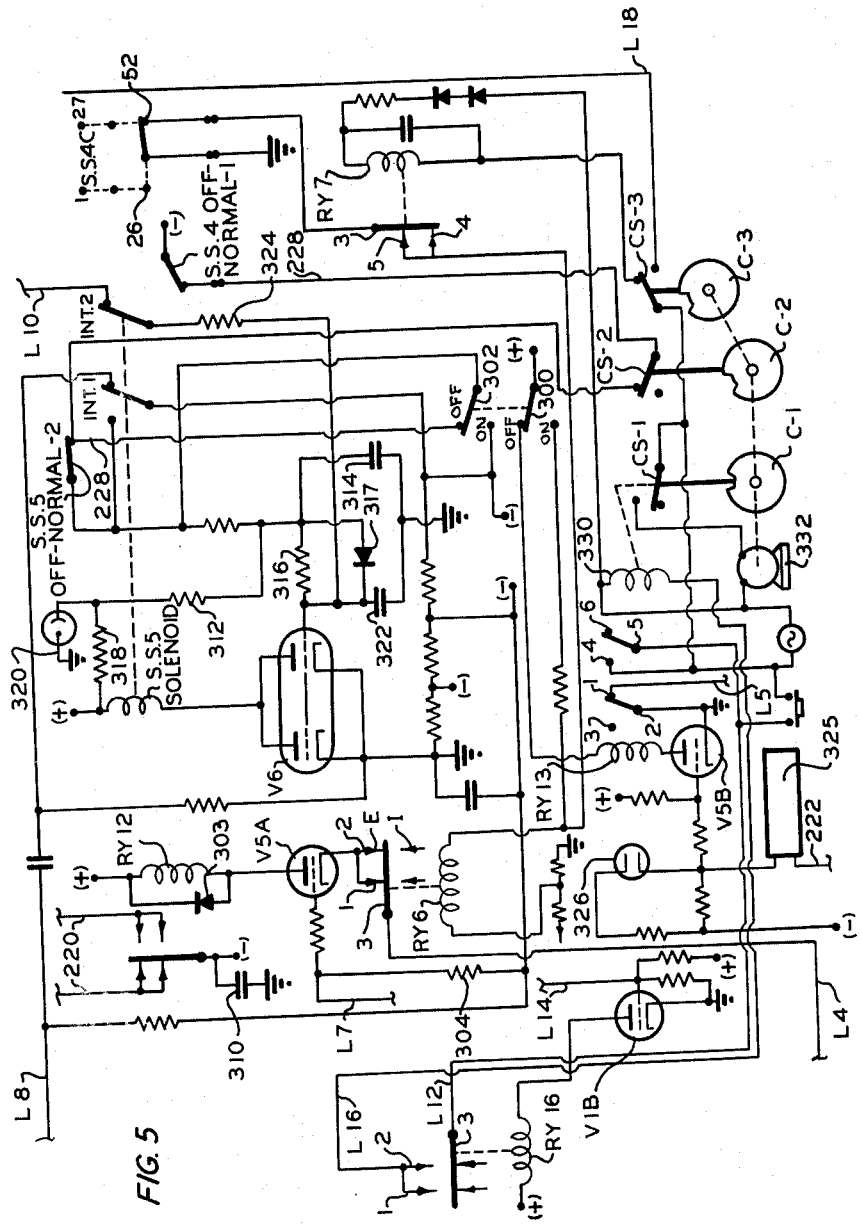
Figure 6:
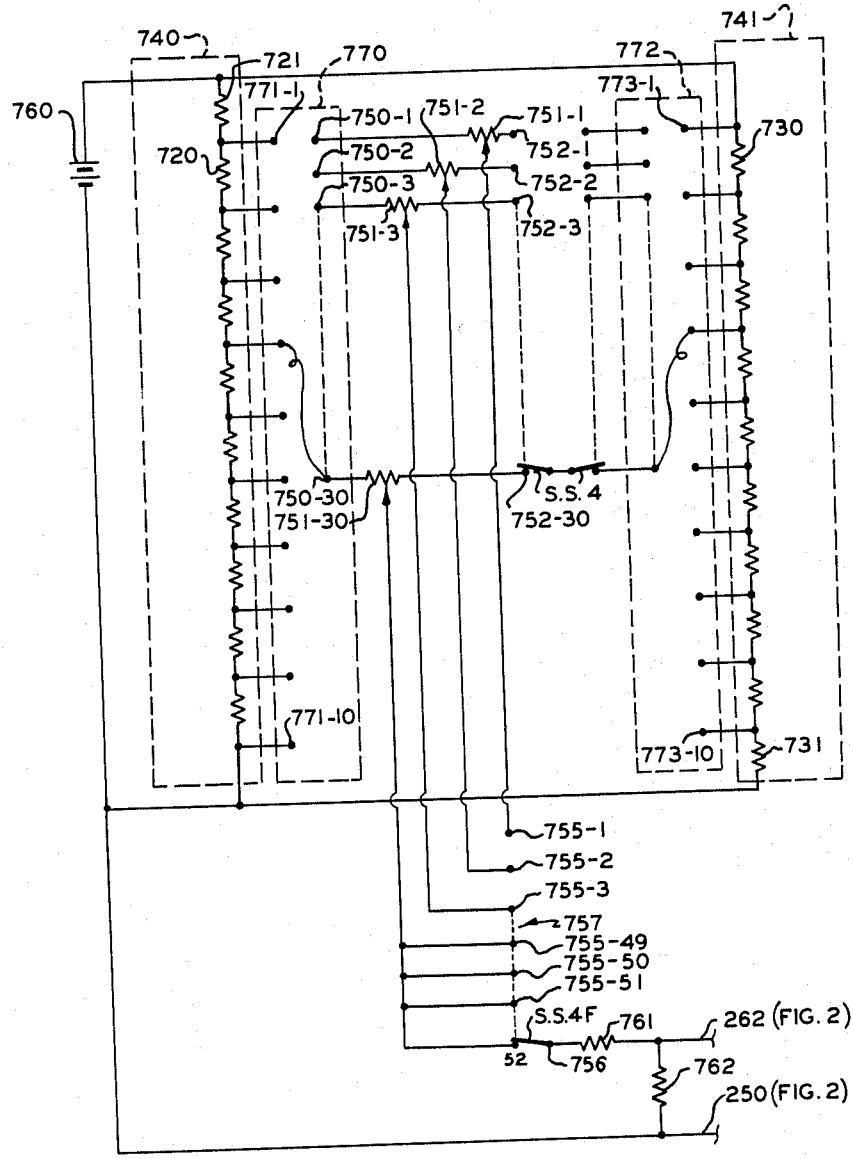
Figure 7:
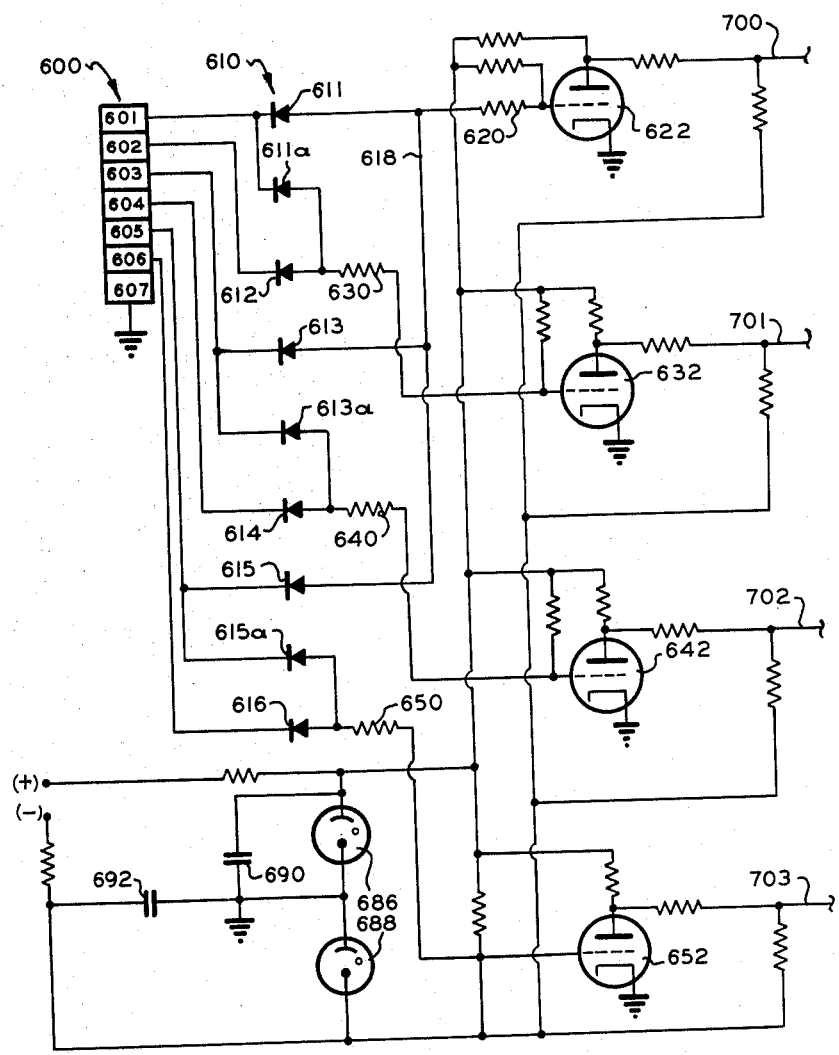
Figure 8:
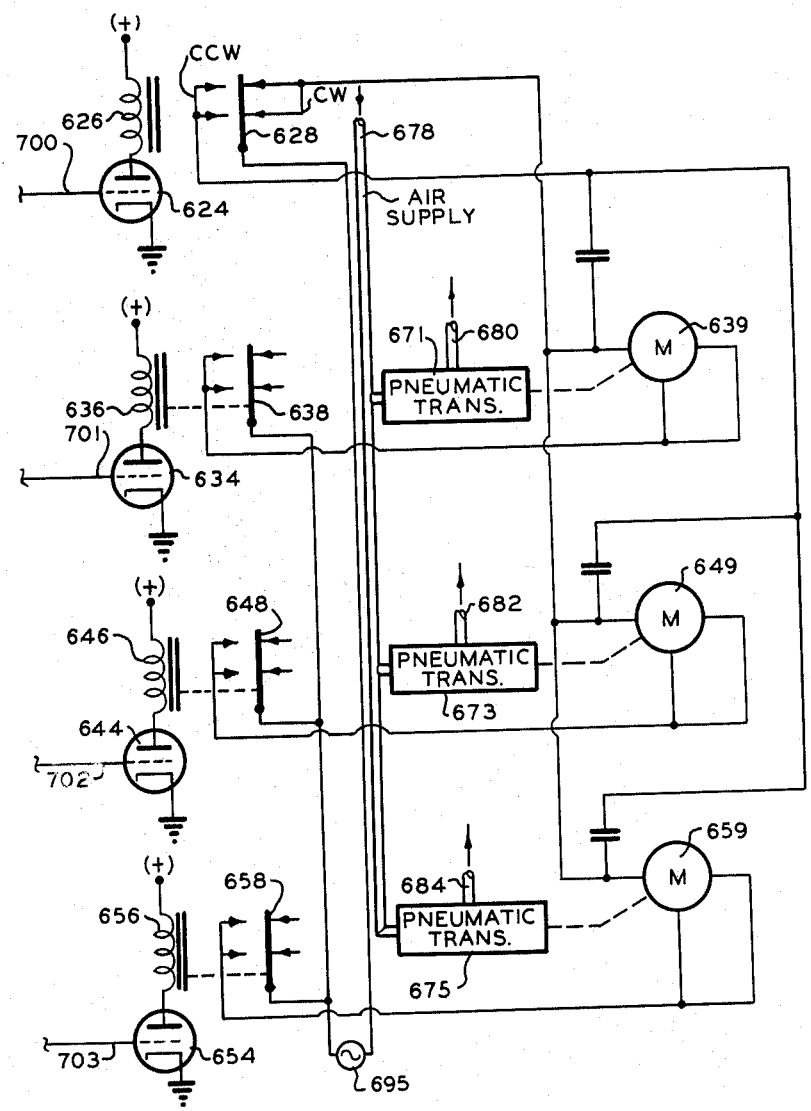
Figure 9B:
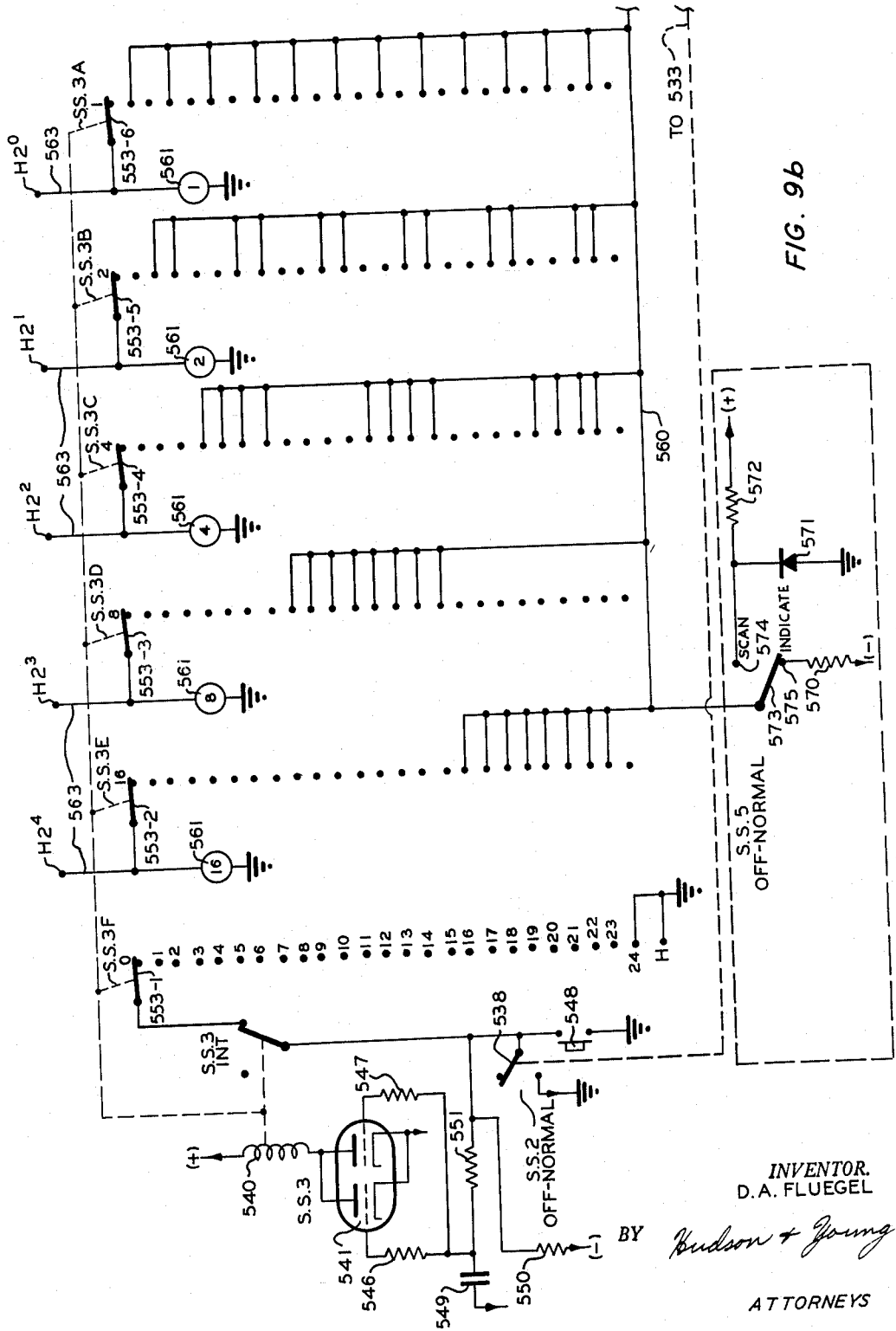

In the drawings:
FIGURE 1 is a schematic diagram of the data, collection and sequence system for the digital computer.
FIGURES 2, 2a illustrate details of the analog sequencer stepping switch and zero suppression span select of FIGURE 1.
FIGURE 3 illustrates circuit details of the digital sequencer stepping switch of FIGURE 1.
FIGURE 4 illustrates circuit details of the analog and digital switches required to provide the analog switch scan point advance and data transfer circuits of FIGURE 1.
FIGURE 5 illustrates circuit details of the digital sequencer scan start and scan rate timing circuit of FIGURE 1.
FIGURE 6 illustrates circuit details of an alternate zero suppression circuit.
FIGURES 7 and 8 illustrates circuit details of the digital computer controlled equipment.
FIGURES 9a and 9b illustrate circuit details of the digital clock of FIGURE 1.

I have discovered a method of and apparatus for transmitting electrical signals representative of process measurements in sequence, zero suppressing the signals, amplifying the signals, converting the signals into digital form and sequencing the converted signals into the digital computer input register. I have further discovered a method of and apparatus for translating the electrical output signals of a digital computer into pneumatic control signals which are proportional to computer computations.

A schematic diagram of the digital computer data collection system is illustarted in FIGURE 1. Generally speaking, the purpose of this system is to receive process data, to select each individual data point sequentially and to measure and transmit the data through an analog digital conversion system to thus provide signals in the form of "words" comprising digital bits, which are then fed into the digital computer. Where required, although it is an optional feature and depends upon the construction of the digital computer, the data collection system also breaks the words down into groups of digital bits. Each group of bits is of a size that can be channeled through the digital computer into the computer memory. With some digital computers, this operation is necessary as a word of, for example, 15 bits cannot be channeled through the computer into its memory although the digital computer memory can store a word of 15 bits. Hence, it is necessary to reduce the word to, for example, three groups of five bits each.

Referring again to FIGURE 1, there is illustrated schematically the data collection system employed to obtain process data to be utilized in the control of a thermal cracking furnace. The thermocouple measured furnace temperatures are in electrical form and as such, are first applied to a cold junction compensator 200. It is the function of compensator 200 to maintain a cold reference junction for each thermocouple at a fixed temperature, illustrated as 150° F. This can be accomplished by enclosing the reference junction in a zone that is controllably heated to maintain the temperature at 150° F. automatically. Such devices are well known in the art and are described in Considine, chapter II, or in Rhodes, "Industrial Instruments for Measurement and Control," first edition, McGraw-Hill (1941).

The pneumatic signals representing the respective pressures and differential pressures measured about the thermal cracking process are individually applied to pressure transducers 202 which can comprise a plurality of commercially available P/I transducers to convert the respective pressures into electrical equivalents. These circuits are well known in the art and are described in Considine, "Process Instruments and Controls Handbook," pages 3–37 to 3–45.

The output signals from compensator 200 and from transducers 202 are applied through respective channels 203 to an analog sequencer 204 comprising a plurality of cooperating stepping switch levels, hereinafter more fully described. The analog sequencer 204 receives all of the analog signals at its input terminals and transmits them one at a time, obtaining the instantaneous value of each one seriatim, and applying each signal so treated to appropriate means for further processing towards conversion to the digital word representing the instantaneous value of the analog signal.

The instantaneous values produced by the input variables connected through stepping switch 204 are also passed to a zero suppression circuit which is part of the circuit of 204. The purpose of zero suppression is to set the low end of each of the temperature and pressure ranges for zero signal input to amplifier 208. This reduces the amplitude of signal the amplifier must handle and results in better resolution over the desired temperature and pressure spans.

The individual low level data signals are selected one at a time by the analog sequencer 204 and are applied to a differential amplifier 208 through a channel means 206. The gain of the amplifier 208 is changed when a respective signal is applied thereto by transmitting a signal through a channel means 210 into the amplifier 208. A suitable amplifier is described by Burwen on page 43 of the July 24, 1959, issue of Electronics in an article entitled "Amplifiers for Strain Gauges and Thermocouples." As shown in Figure 2 of said article, the gain control channel means 210 is actually a stepping switch bank level that operates to change the value of the amplifier feedback resistor. This conventional stepping switch bank level (SS4D) is illustrated in FIGURE 2a. In my invention, since I use stepping switches in sequencer 204, the construction of Burwen is most convenient and only need be modified by providing a stepping switch bank level having the same number of contacts as in my sequencer 204 and which bank level also is mechanically connected thereto for moving in proper synchronism.

An output signal is transmitted by channel means 212 to an analog to digital converter 214 wherein such signals are converted from an instantaneous value of an analog signal into a word comprising a plurality of digital bits. Analog to digital conversion means are well known in the art and are described in such U.S. Patents as: Forbes, 2,754,503, issued July 10, 1956; Kuder, 2,761,968, issued September 4, 1956; Kaiser, 2,784,396, issued March 5, 1957; and references cited in the same; as well as a general description of the same in chapter 15 of "High Speed Computing Devices," first edition, Engineering Research Association, published by McGraw-Hill in 1950.

Each bit in a digital word represents a specific value, and in the case of ordinary digital computers, each bit represents a specific power of 2. Accordingly, the bits making up one digital word travel over a plurality of channels 216 from the converter 214 to a digital sequencer 218. As noted above, the function of the digital sequencer 218 is to break the words up into the number of bits that the digital computer can receive and transfer the same into the computer input register. The groups of digital bits appearing at the output of digital sequencer 218 are transferred through a plurality of channels 220 into a digital computer.

A data collection system clock designated as a digital clock 229 provides time information in digital code to the digital computer when each data scan is completed. The hours word is transmitted to digital sequencer 218 via channel means 230. An inhibit pulse applied to the digital clock 229 through a channel 231 prevents clock advance during time-signal read-in to the computer. For the event of coincidence between clock advance pulses and time read-in, the clock advance pulse is stored until read-in is completed.

The digital computer cooperates with the digital sequencer 218 and the analog sequencer 204 by transmitting a signal back into the data collection system through a channel means denoted generally as 222. This transmitted signal tells the two sequencers that an entire series of calculations has been completed and that it is now time to accumulate a new set of data for the purpose of further calculations. Further, when the computer is in the process of receiving data as set forth above, the signal transmitted through channel means 222 also tells the remainder of the data collection system to prepare itself for gathering another set of data in the sense that another set of temperature and pressure readings will be transmitted through the data collection system into the computer. The data collection system transmits a signal through channel means 224 into the analog to digital converter in order that the latter be prepared to convert any signals appearing at its input terminals. Another response for the digital sequencer 218 is to transmit a signal through channel means 226 back to the analog sequencer 204 so that the latter will rotate the various stepping switches to all positions to which the used input variables are connected and, in addition, to continue this rotation through all of the contacts and position itself for transmitting a new set of data to the amplifier 208 in the order that it is to be received and processed by the digital sequencer 218 (called "homing"). The analog sequencer sends a signal forward through channel means 228 to the digital sequencer 218 to advise the latter that an entire set of data has been scanned. In response to this, both of the sequencers 204 and 218 are stopped in the "home" position. The exact manner in which this occurs is described hereinafter.

FIGURES 2–5 show the details of the analog sequencer 204 and digital sequencer 218, including an input circuit generally comprising stepping switch banks SS4G and SS4H, a zero suppression circuit, as generally comprising stepping switch bank SS4F, and the span control stepping switch bank SS4D described above with respect to the differential amplifier. All of the analog sequencer stepping switch banks have the same number of contacts, and in the illustrated embodiment, they all have 52 contacts. All of the individual stepping switch banks are mounted on one shaft so that they can operate together. For convenience, and to present a smaller and more compact drawing, each stepping switch is shown as having two rows of contacts, it being understood that there are in face two levels of contacts for each bank level and two contactors which alternately engage the individual contacts on the two contact levels. Channel means 226 of FIGURE 1 is connected to SS4A and SS4B and because of their cooperation with the digital sequencer 218, these two individual stepping switch bank levels will be described below with relation to digital sequencer 218. All of the individual stepping switches step together responsive to the conventional solenoid operation of a ratchet and pawl arrangement, the solenoid being actuated by a pulse generated by digital sequencer 218. The pulse generator will also be described below with reference to sequencer 218.

Referring again to FIGURE 1, the analog sequencer 204 receives signals from the cold junction compensator 200 and pressure transducers 202 at its input terminals 203. After processing through the analog sequencer 204, the signals produced therein which represent the instantaneous value of the input signals 200 and 202, appear at the pair of leads 206 and are applied thence to the differential amplifier 208. In FIGURE 2, means are provided to connect the terminal block that represents the input terminal block 203 to stepping switch bank levels SS4H and SS4G. Each terminal on the block 203 is connected to a corresponding contact on SS4H or SS4G, as the case may be. Negative terminals such as −1 are connected to the number 1 contact of SS4H and positive terminals such as +1 are connected to terminal number 1 on SS4G. This same formula is applied for connecting the other terminals on the block to the stepping switches SS4G and SS4H. Terminal block −1 is discussed as representative and is connected to contact number 1 on SS4H through a resistor 240–1, and terminal block +1 is connected in like manner to its corresponding contact through resistor 242–1. Contact No. 1 on SS4H is connected to its counterpart on SS4G across a condenser 244–1. A similar construction is provided for each and every one of the pairs of terminals and correspondingly numbered contacts on SS4H and SS4G. Thus, in the embodiment that includes fifty-two such contacts, there are fifty-two resistors 240–1 through 240–52 and 242–1 through 242–52 and fifty-two condensers 244–1 through 244–52.

The negative output signal from SS4H is removed from contactor 246 through a resistor 248 and applied to a negative lead of 206. A positive signal is removed from the contactor 250 of SS4G and applied to the zero suppression circuit as shown generally in SS4F. A plurality of voltage-dividing circuits designated generally and respectively as 254, 256, 258, and a spare voltage-dividing circuit 260 are connected in series between 250 and SS4F. As the stepping switch rotates, a positive signal is removed from 250, applied in series with the selected voltage-dividing circuit to a correspondingly numbered terminal on SS4F and withdrawn from the latter by its contactor 262 from whence it is applied to the amplifier input positive lead 206 through a resistor 264. A zero suppression circuit functions to set the lower end of the temperature and pressure input signals to zero level. The signal appearing at amplifier input leads 206 is filtered by the combination of resistor 264, capacitor 266, and resistor 248. Leads 206 are connected to the input terminals of differential amplifier 208.

In FIGURE 2, cell 290 in cooperation with potentiometer 292 and voltage divider 294 provide the negative potentials required for zero suppression of thermocouple signals, for example, whose operating range or span starts at a temperature above that of the cold junction compensator 200 of FIGURE 1. Potentiometer 292 can be adjusted for a particular current flow in precision voltage divider 294. The zero suppression potentials required are obtained from points such as 254 and 256 on the divider. Said potentials, selectively connected to points on SS4F provide the corresponding data channels with the proper zone suppression potentials. Similarly, cell 291 in cooperation with potentiometer 293 and voltage divider 295 provides the positive potentials required for zero suppression of the thermocouple signals and other transducer signals whose operating range or span starts at a temperature below that of the cold-junction compensator or is below 0 millivolts (negative).

Referring to FIGURE 6, there is illustrated another method of zero suppression signal voltages received from SS4G. The object of the circuit of FIGURE 6 is to provide a flexible means for setting in the proper level of zero suppression potential for each of, for example, thirty input variables, individually or in groups. (The latter case would apply to input variables requiring the same zero suppression.) A polarity reversing relay (not shown) can be used to reverse the polarity of the zero suppression potentials by reversing connections to source 760.

Voltage dividers 740 and 741 are connected to a stable known supply source 760. The various known outputs, for example, steps of 0, 0.2, 0.4–to 2.0 volts, are connected through voltage divider output terminals such as 771 and 773 to two rows of pin boards 770 and 772. Resistors 721 and 731 provide a 10 millivolt offset across pins 771–1 and 773–1, for example. End terminals of potentiometers 751–1 through 751–30 are connected to pin board terminals 750–1 through 750–30 and to pin board terminals 752–1 through 752–30. Contactors of potentiometers 751–1 through 751–30 are tied either to individual contacts, such as 755–1 on stepping switch bank level SS4F, or to groups of contacts such as shown by 755–49 through 755–51. The wiper 756 of switch bank level 757 is connected to a precision divider shown as 761 and 762 for attenuation to a millivolt level. The potential across resistor 762 is applied as the programmed zero suppression in series with amplifier 208 input terminals via leads 262 and 250, replacing the voltage divider 294 and 295 outputs of FIGURE 2.

In operation the above described circuit allows the range of each zero suppression potentiometer to be selected in increments of 10% of the full scale zero suppression. The pin boards permit selection of any one of the 10 ranges for any of the thirty potentiometers, thus increasing the resolution of the potentiometers by a factor of 10.

The analog sequencer 204 hasits various stepping switch wipers step through their series of operations in unison by means of mounting trem on a common shaft and rotating them through a ratchet and pawl arrangement that is in turn operated by a solenoid 270. See FIGURE 4. This solenoid is connected at one end to a source of positive potential, and current flows through it by applying pulses to a keyer tube 272, which, as illustrated, is a double triode. Grid resistors 274 and 275 connect the triode control grids to a common condenser 276 which is grounded on the other terminal. Pulses to operate the keyer tube and solenoid are received across the resistor 288. Contacts 280 and 284 of the SS4 off-normal 2 switch 282 connect the keyer tube to a selected source of pulses from contact closures on SS5B or SS5E.

Manual movement of the stepping switch is accomplished by manipulating a switch 286. A source of negative potential is connected across resistor 288 to both the switch 286 and resistor 278. The stepping switch advances one position for each complete operation of switch 286.

In order to describe digital sequencer 218, it is assumed that a digital word of ten bits is to be broken up into two groups of five bits each for purposes of being fed into the digital computer. The structure for accomplishing this comprises five stepping switch bank levels, SS5G, SS5H, SS5I, SS5J, and SS5K, see FIGURE 3. Individual bits are fed through these five stepping switches through a plurality of relays associated therewith and finally into the digital computer through the leads of channel means 220 in FIGURE 1 and in FIGURE 3 through leads K1, K2 . . . K5. A timing and interlock system is provided to insure that the signals appear at the right place at the right time and to cause stepping switch 4 (SS4 of 204) to move in cooperation with the digital sequencer, 218 (SS5). In this connection, stepping switch bank levels SS4A, SS4B, and SS4C, cooperate with stepping switch 5 in order to make or break a particular electrical circuit at desired times. The connections to other apparatus are shown as illustrated in FIGURE 1.

In FIGURES 2 through 6, certain conventions are employed; all of the solenoids are shown in the position where there is no current in their coil, i.e., all of the relays are shown in the deenergized position; the system of both SS4 and SS5 is arranged for handling 31 pieces of information or words, the remaining contacts on SS4 being spare positions and a similar arrangement of contacts in SS5B being spare positions, it being understood that any number of words can be channeled through the analog and digital sequencers, provided an appropriate number of contacts and wiring therefor is provided; in the embodiment shown, the stepping switch SS5 rotates 10 times for each complete cycle whereas stepping switch SS4 rotates only once for each complete cycle or "scan" of information.

In the following description, certain terms are employed, and are defined as follows:

Home—position 26 on SS5 and 52 on SS4, which position is that in which each switch finds itself immediately before the start of a scan and immediately at the end of a scan.

Scan—transmitting through the analog and digital sequencers 204 and 218 respectively, one complete set of data, i.e., one complete set of temperatures, pressures, etc., as derived from the furnace data. One complete scan moves SS4 from home to home (from 52 to 52, referring to contact numbers) and SS5 rotates ten revolutions during this time and moves from home to home, i.e., from contact 26 through to the same contact.

Enabled—this term means just what it says, that is, when a circuit is stated to be enabled it has been prepared for performing a certain action upon the receipt of an electrical signal which is transmitted therethrough in a predetermined manner.

Inhibit—the circuit or element has been placed in the position where it cannot perform a function regardless of any signal, electrical or mechanical, applied to it.

Channels 216 are represented in FIGURE 3 as a terminal block having connections to stepping switches SS5G, SS5H . . . SS5K, respectively. Each connection to each stepping switch bank level represents an individual power of two in the binary code as received from ADC 214 of FIGURE 1. For example, the drawing shows a lead having a symbol $2^4$ connected to contacts 5, 9, 13, 17 and 21 of SS5K. The corresponding connections for $2^9$ are shown for SS5K on contacts 4, 8, 12, 16, 20. Similar arrangements for other powers of 2 are shown for the other individual stepping switch bank levels. It is to be understood that all of the stepping switch bank levels such as SS5G, SS5H, SS5I . . . SS5K, are connected in like manner. This provides power of 2 representation between $2^0$ up to $2^9$. For convenience, only one channel from the terminal block representing 216 through to the leads 220 will be described, it being understood that other channels are constructed in like manner.

Referring again to SS5K, it is seen that a lead L1 is connected to a contactor of the stepping switch and to the grid of keyer tube V2A. The anode of tube V2A is connected to the coil of a relay RY1 which is connected to a power supply by means of a lead L2. As seen in the drawing, other keyer tubes for the other stepping switch bank levels SS5G–SS5J are connected to the same power supply which is preferably plus 130 volts D.C. The solenoid operates a switch arm in the relay in the usual fashion. The switch arms of the various relays are connected by a lead L3 to a minus power supply, using binary motation, when a 0 appears on a $2^4$ or $2^9$ lead connected by the switch wiper to the grid of V2A, there is no change in the state of keyer tube V2A and the relay does not change position. Hence, a "0" bit is transferred to the computer over channel K5. If a 1 appears on the $2^4$ or $2^9$ leads of SS5K while so connected to V2A, it enables keyer tube V2A, closes relay 1 contacts, and transfers a negative pulse or "1" bit, representative of the appropriate power of 2 through channel K5. A similar action takes place with respect to the other stepping switch bank levels, their respective keyer tubes and their respective relays. Channels K1 . . . K5 are shown in FIGURE 1 as individual channels in channel means 220.

A lead 4 is connected between the cathodes of the relay keyers for relays 1 through 5 and the contact arm of polarized relay RY6 of FIGURE 5. Relay RY6 permits enabling or inhibiting relay 12 for purposes which will be hereinafter explained. Lead 4 is also connected to the lower two contacts of relay RY11 in FIGURE 4. Relay 11 is enabled or inhibited as the case may be by signals received in the keyer tube V4B from the lead L5. Lead L5 is connected to ground through the lead L6 and selected contact on the stepping switch SS4A. This connection permits inhibiting leads K1 through K5 and TPP and TPP$^1$ of 220. (Two lines which effect data transfer to the computer input register.)

At this point, it should be noted that TPP is merely a timing pulse which is sent by relay 12 into the digital computer. This pulse tells the computer to read the information on the five K lines (220) at the time of the pulse. Therefore, when TPP is inhibited, the computer cannot read the information. One appropriate time for inhibiting is when a computer is going through a computing routine and does not desire to receive any input data, since the input register must be free of the data system during the computing cycle.

Lead L5 extends from V4B to a contact in relay RY13. The solenoid of relay RY13 is connected between the anode of keyer tube V5B and a D.C. power supply through the "off" terminal of the manually operated inhibit scan switch 300. Automatic scanning of information takes place only when switch 300 is in the "off" position. If this switch is turned to the "on" position, it inhibits transmission of signals through the TPP leads 220 by inhibiting relay RY6. It also inhibits the five K lines of 220 via operation of RY11.

The various functions of relay RY6 are described below along with other relays in greater detail. The relay RY6 is a polarized relay that latches in either one of its two positions, to enable or inhibit, and requires a signal of opposite polarity to unlatch and to move it from either of its two positions to the other. A mere turning off of the signal after relay RY6 is latched will not change its position. The contact of relay RY6 connects lead 4 to keyer tube V5A which contains a solenoid for relay RY12 in its anode circuit in parallel with the diode 303. As is usual with all the keyer tubes in the instant circuit, a plus 130 volt power supply is provided. The control grid of keyer tube V5A is connected by lead L7 to the contactor of stepping switch SS5C of FIGURE 4, selected contact to the latter being connected through lead L8 to stepping switch 5, interruptor 1, which generates a positive pulse on L8 when SS5 solenoid is energized. The grid is also connected across resistor 304 to a negative bias.

Referring now to SS5F of FIGURE 3, the contactor of 5F is grounded. Lead L9 is connected to the control grid of keyer tube V1A which controls the operation of relay RY15, the contacts of which control the transmission of the start conversion pulses through the channels 224 between the digital sequencer and the analog-to-digital converter 214.

Relay RY12 of FIGURE 5 coacts with keyer tube V5A to provide a rapid make and break action between the contacts thereof to provide the timing pulses in channels TPP and TPP'. These channels are part of what is denoted broadly as 220 in FIGURE 1 and transmits information between the digital sequencer 218 and a digital computer. In order to provide the required voltage TPP pulses, the contact arm of relay 12 is connected to a proper voltage source and is also grounded through a condenser 310.

The normally open contact of SS5 interruptor 1 acts as a second half of the multivibrator circuit that includes the double triode V6. The important parts of the timing circuit of the multivibrator includes resistor 312 and condenser 314, both of which are connected to both control grids of the double triode across resistor 316. A diode 317 is connected in parallel with 316 and is polarized to allow capacitor 322 to charge to a positive potential faster than it is allowed to discharge through 316. Resistor 312 is connected to the power supply through resistor 318, the voltage being regulated by a voltage regulating tube 320. Interruptor 1 is ganged to interruptor 2 and both are operated by the SS5 solenoid that is connected in the anode circuits of triode V6. Also the grid V6 is connected to ground across condenser 322. The cathode of V6 is connected to ground. A plurality of series connected resistors also connect the arm terminal of inhibit scan switch 302 which is ganged with switch 300 to the grids of V6. Both 302 and 300 are manually operated. As previously noted, the function of this particular switch is to stop the scanning during the time the computer is in the compute mode or such times as it is not desirable to automatically scan information to be fed into the computer through the data collection system. A negative power supply is also connected to these resistors and to the arm of interruptor 2, the latter being ganged to interruptor 1 for operation by SS5 solenoid, and also being connected into the grid circuit of the multivibrator tube V6 across resistor 324. Interruptor 2 and SS5D provide a "homing" means for stepping switch 5 at selected positions of SS4A and SS4B.

As illustrated in FIGURE 1, the digital computer transmits start and stop scan signals through a channel means 222 to the digital sequencer. This is transmitted thence to a "remote control" 325 of FIGURE 5. The remote control is a timing switch that limits the time that the data collection system operates to that required to run through the data, feeding the data into the computer for inspection. It permits an operator in a remote location to control the start of a data scan which is otherwise normally controlled by the computer. For the purpose of this embodiment, the time that the circuit is maintained closed by remote control 325 is to be taken as that necessary to obtain a complete set of data. This can comprise a synchronous motor driving a cam which would maintain the switch closed for the requisite time. When a scan start signal appears, an indicator light 326 is turned on. This signal, transmitted to the control grid of keyer tube V5B, controls the relay RY13. Conduction by tube V5B moves the ganged contact arms of relay RY13 away from contacts 1 and 6 and against contacts 3 and 4. Contact 4 is thus connected by a lead L12 to the contact arm of RY16. If stepping switch 4 is in home position, lead L14 is grounded through contact 52 of SS4A and therefore tube V1B conducts and the relay 16 is energized to move its contact arm up against contacts 1 and 2 of that relay and this operation completes a circuit between lead L12 and L16 to thereby complete a circuit through the solenoid coil of hold relay 330. If SS4 and therefore SS4A are not in home position, this operation will not occur until SS4A has been stepped to said home position.

When hold relay 330 moves its contact switch arm CS–1 into position, a circuit is completed through the synchronous timing motor 332 which then begins driving the respective timing cams denoted as C–1, C–2, and C–3. The respective timing cams operate their respective switch arms CS–1, CS–2, and CS–3. As the synchronous timing motor 332 drives these cams, C–3 moves its arm CS–3 against the lower contact and thereby completes a circuit through said mechanism and line L–18 to counter 334 of FIGURE 4. The counter is any of several commercially available electrical-mechanical devices that respond to electrical impulses by moving a mechanical leg to display, at this point, the channel of SS4 through which information is being fed. Various such devices are shown in Hoag "Basic Radio" Van Nostrand (1946) on pages 190, 234 and 237.

When CS–3 first moves to its lower contact, the channel counter is reset to "zero" so that the solenoid of relay RY7 is deenergized and this relay moves against the contact or pin numbers 4 and 5 of said relay to thereby complete a circuit to ground through SS4C at position 52 to energize the polarized relay 6 in such a direction as to move the contact arm against the upper contacts (1 and 2) of relay RY6. This enables the TPP circuit to the computer. The polarized or latching feature of relay RY6 causes it to stay in position regardless of future actions of CS–3. Relay RY6 is provided to inhibit TPP circuit whenever the scan inhibit switch is turned on for test or calibration purposes.

The switches denoted as SS4 off normal-1, SS4 off normal-2, and SS5 off normal-2 are mechanically coupled to the mechanism of stepping switches denoted by the names of the switches. They are arranged thereon so that each of them makes, maintains and then breaks its respective connection once per revolution of the respective stepping switch, SS4 or SS5. SS4 off normal-1, provides a signal to stop the scan, i.e., it is part of channel 228 and when its position compares to that of SS5 off normal-2, then the scan or automatic scan is stopped. (Note that connection through CS–2 must also be closed to stop scan.)

The digital clock of FIGURE 1 is represented schematically in FIGURES 9a and 9b. Its purpose is to generate, in binary code, a time word representing the hours and minutes of the day for transmission to the computer through digital sequencer 218 of FIGURE 1. Following is a description of digital clock operation.

A synchronous motor 516 energized by a power source 517 rotates cam 515 and operates cam switch 514 to generate a pulse once per minute. The pulse energizes solenoid 500 through relay contacts 503 and 501. When 500 is de-energized by the opening of cam switch 514, 551 advances one step. Relay RY14 creates an inhibit and store condition when the time word is in the process of being transmitted to the computer. Relay solenoid 502 is held energized by closing of SS4E wiper 505 on position 31 to line 504. This holds SS1 solenoid 500 energized until SS4E advances to position 32. Thus a clock advance pulse generated by cam switch 514 or manual advance control 508 is stored until transfer of the time word to the computer is completed. A bias network comprising resistors 506, 507, 510, 511 and capacitor 509 holds tube 501 in a cut-off condition until a clock advance pulse is generated.

SS1 bank levels SS1A, SS1B, and SS1C are wired to generate time bits $M2^0$, $M2^1$, and $M2^2$ as SS1 wipers 519–1, 519–2, 519–3 advance. The combination of these binary bits can represent time in minutes from 0 through 7. (Corresponding to positions 0 through 7 on SS1.) On position 8 of SS1, wiper contact 513 is grounded by the remaining switch positions causing SS1 to operate self-interrupted to the zero switch position. This causes one complete operation of SS1 off-normal contact 518 advancing SS2 from 0 switch position to the 1 position. Operation of 518 causes a pulse to be applied to tube 521 grids through bias network of resistors 526, 527, 530, 531 and condenser 529. SS2 solenoid is energized and de-energized causing an advance of one position for each operation of contact 518. Manual advance control 528 is used to advance the clock in 8 minute steps to set time. Note that SS1D switch positions 4, 5, 6, and 7 are wired to SS2D position 8 through line 522. This connection causes SS1 to advance to "0" position automatically when the binary time word reaches 60 minutes. This causes SS2D wiper to advance one position and wiper 533 contacts line 523 causing SS2D to advance to the "0" switch position by operation of interrupter 524 at the end of 59 minutes. This operates SS2 off-normal contact 538 to advance the hours stepping switch one position. Binary time bits $M2^3$, $M2^4$, and $M2^5$ are generated by the wiring of SS2A, SS2B, and SS2C as SS2 wiper 5523–1, 523–2, and 523–3 advance through their respective positions. Each successive advance of SS2 adds the decimal value 8 to the existing time work in binary code through the decimal value 56 on position 7 of SS2.

In summary, SS1 generates decimal values 0 through 7 while SS2 generates decimal values 0 through 56 in incremental decimal values of 8. On the 8th cycle of SS1, the decimal values 0, 1, 2, and 3 only are generated. Both SS1 and SS2 automatically return to position 1 or "0" time. In the process the hours stepping switch SS3 is advanced 1 position. Lines 564 connected to wipers 519 and 523, transmit the minutes time word in binary code to the digital sequencer stepping switch bank levels SS5G–SS5K of FIGURE 3.

Since the hours time word need only contain the decimal values 0 through 23, it becomes convenient to use a 25 position stepping switch to generate these values in binary code. This is accomplished by the wiring of SS3 bank levels SS3A–SS3E. Each successive advance of SS3 adds 1 hour to the binary code representation of the hours. SS3 bank level SS3F is used to advance SS3 to the 0 hours' position when the decimal values in the clock reach 23 hours, 60 minutes. Lines 563 are used to transmit the hours time word to the digital sequencer stepping switch bank levels SS5G–SS5K of FIGURE 3. As SS3 wipers 553–1—553–6 advance in sequence, the appropriate binary time word is generated and appears on lines 563 as a combination of $H2^0$–$H2^4$ in the form of binary "ones" and "zeroes."

Stepping switch SS3 is advanced through its cycle by operation of SS2 off-normal 538. Bias resistors 546, 547, 550, 551, and capacitor 549 hold tube 541 in a normally cut-off condition. The pulse generated by operations of SS2 off-normal 538 causes tube 541 to conduct energizing solenoid 540. When 538 returns to its normal position tube 541 is again cut off allowing SS3 solenoid to be de-energized so as to advance SS3 by one position. A manual advance switch 548 is provided to allow the correct time to be set into the clock.

Indicators 561 and 562 respectively produce a visual indication of the position of the hours and minutes stepping switches. A source of potential supplied through resistor 570 and contacts 573 and 575 of the digital sequencer SS5 off-normal contacts is connected via line 560 to the indicators whenever SS5 is in the "home" position. During a scanning operation a source of positive potential is applied to line 560 through resistor 572 and reference diode 571 by connection of contact 574 to arm 573 of the SS5 off-normal switch. This bias, selected by SS1, SS2, and SS3 switch positions is used to control relays RY1–RY5 of FIGURE 3 in accordance with the binary code representation of time as stored in the particular stepping switch bank positions.

The following example is presented as illustrative of the operation during one automatic scan cycle. The paragraphs are numbered to conveniently denote operations taking place within the data collection system and more particularly within the analog and digital sequencer stepping switches SS4 and SS5, respectively.

*Operation sequence for data collection system*

(1) Initially the scan timer and SS4 and SS5 are all in "home" position. Scan timer motor is de-energized.

(2) Scan start signal is applied from the computer. Scan start indicator lights, V5B conducts, relay RY13 is energized. Relay RY13 contacts 1 and 2 open. This cuts off current in V4B and relay RY11 is de-energized, closing contact 3 to 4 and 5. This enables tubes V2, V3, and V4A and also ties pin 3 of relay 6 to ground. The function of relay RY13 is to inhibit relay RY1 through RY5 and also relay RY12 so that the data collection system is in effect disconnected from the computer when data collection is not in progress and thus cannot interfere with computing operations.

(3) Relay RY13 contacts 4 and 5 close energizing the hold solenoid on the scan timer through contact 3 to 1 and 2 of relay RY16. The arm of CS1 closes to the upper contact and is latched in this position for one scan timer cycle. Thus the scan timer will complete one cycle on command of a short scan start pulse. Note that tube V1B is conducting and relay RY16 is energized because SS4A is in position 52 (or "home"). The function of relay RY16 is to prevent the scan timer from starting if SS4 is not in the home position. The scan timer must wait for SS4 to reach "home" position because the sequence of data would be incorrect if SS4 was in some other position when the scan timer starts. Note that this interlock also applies to the manual scan start control.

(4) Arm of timer CS–3 closes to the lower contact which energizes the reset mechanism of the channel counter. This resets the counter to zero. The upper contact of CS–3 opens de-energizing relay 7 and closing the connection between the arm 3 and contacts 4 and 5. This causes a current to flow in polarized relay RY6 in such a direction as to close contact 3 to 1 and 2 of relay RY6 to enable the TPP lines to the computer. The polarized feature of relay RY6 causes it to remain in the enable position after CS–3 returns to its normal position. Relay RY6 is provided to inhibit the TPP circuit whenever the scan inhibit switch is turned on for test or calibration purposes. With relay RY6 in the inhibit position, TPP pulses cannot to generated. This insures that signals will not be sent to the computer which might interfere with computer operation, during testing or calibrating of the sequencer. If the scan inhibit switch has been thrown to the "on" position, relay RY6 will stay in the inhibit position until the scan start command has been given by the computer and CS–3 de-energizes relay RY7. (The other pole of the scan inhibit switch disables relay RY13 so a scan cannot be started when said inhibit is on.)

(5) CS–2 opens allowing the multivibrator (V–6 and SS5 interruptor 1) to advance SS5 at a speed determined essentially by capacitor 314 and resistor 312. The line from CS–2 is connected through SS4 and SS5 off normal (closed at "home") switches. Once SS5 begins to advance through a cycle, the SS5 off normal opens. When SS4 begins to advance, the SS4 of normal opens. Therefore, the CS–2 switch can be returned to the closed position without stopping the action of the multivibrator. The switches SS4 and SS5 continue to advance until they both return to home position simultaneously. This occurs at the end of a complete scan cycle of SS4 and after ten complete revolutions of SS5. A negative bias is applied to the grid circuit of V6 through the above three switches to stop the multivibrator at the end of each complete scan cycle.

(6) SS5 advances to position one. This causes V7 to conduct by grounding its grid circuit through SS4 off normal-2 and SS5B position 1 causing SS4 solenoid to cock the advance mechanism.

(7) SS5 advances to position two. V7 is again biased to cut off and SS4 solenoid releases the advance mechanism. SS4 advances to position 1. Note that the off normal contacts of SS4 and SS5 have now been transferred.

(8) SS5 advances to position 3. This connects the grid of V5–A via SS5C to line 8.

(9) V6 conducts energizing SS5 solenoid. SS5 interruptor 1 contact transfers and a positive pulse is generated which momentarily transfers the contacts of relay RY12 sending a TPP pulse to the computer. Since all arms of SS5 are still on position 3, relays RY1 through RY3 are de-energized and zeros are fed to the computer via the "K" lines. (An open circuit is equivalent to the binary "0".) The TPP pulse tells the computer to "read" the information on the "K" lines at the time of the TPP pulse. (Since the data words contain only 10 binary bits, zeros are always transmitted for the five most significant bits. Time read in requires 11 bits so that the $2^{10}$ bit is operative only when time from the digital clock is being transferred to the computer.)

These five bits of data represent the five most significant bits of the fifteen bit data word the computer is set to accept. It is within the scope of this invention to substitute other combinations than the fifteen bit data word herein illustrated.

(10) SS5 advances to position four. A start conversion pulse initiated by SS5F is fed to the ADC through V1A and relay RY15. This converts the analog signal amplifier output to digital form. This first conversion represents the valve of the first input variable to the analog sequencer.

(11) SS5 solenoid energizes. SS5 interruptor 1 contacts transfer. Relay RY12 momentarily transfers, sending a TPP pulse to the computer. Information at the output of the ADC (binary "1" or "0") is transferred to the computer input via SS5B through SS5K contacts; V2, V3 and V4A; and relays RY1 through RY5. The energized relays will transmit "ones" while the de-energized relays transmit "zeros". These five bits of data represent the next five most significant bits of the fifteen bit data word to the computer, and are used to transmit the first five bits of the ten bit word generated by the ADC.

(12) SS5 advances to position five. SS4 solenoid is energized by grounding V7 grid through SS4 off normal-2 and SS5E (the SS4 off normal-2 is in the transferred position).

(13) Repeat step 11 except now the least five significant bits of the binary word are transmitted to the computer.

(14) SS5 advances to position six. SS4 solenoid de-energizes and SS4 advances to position two. This connects input variable two to the amplifier input terminals.

(15) SS5 advances to position seven. Repeat step 8 for variable two.

(16) Repeat step 9 for variable two.

(17) SS5 advances to position eight. Repeat step 10. The ADC output register now holds the value of input variable two in digital form.

(18) Repeat step 11 for variable two.

(19) SS5 advances to position nine. Repeat step 12.

(20) Repeat step 13 for variable two.

(21) For SS5 positions 10 through 21, repeat the sequence described in steps 14, 8, 9, 10, 11, 12, and 13 in that order.

(22) SS5 advances to position 22. Repeat step 14. SS4 advances to position 6 causing SS5 to home to position 26 through SS4A position 6 and SS5D.

(23) SS5 advances to position 1. No operations occur since SS4 off normal-2 is in the transferred position and SS4 solenoid is not energized as it was at the start of the first SS5 cycle.

(24) Complete the sequence of operations described by steps 7 through 22 for four complete cycles of SS5 keeping account of the fact that SS4 is advancing from positions 7 through 26 by the end of the fifth revolution of SS5.

(25) Repeat steps 7 through 21 as SS5 advances to positions 1 through 21 on the sixth revolution. SS4 will now be in position 30. Thirty input variables have now been converted to digital form and have been transferred to the computer.

(26) SS5 advances to position 22 on the sixth revolution. SS4 advances to position 31 grounding V8 grid which closes the contacts of relay RY17. Line 8 is now connected to contacts 23, 24, and 25 of SS5C.

(27) SS5 advances to position 23. This connects SS5G wiper to the most significant bit in the time word.

(28) Repeat step 9 except that in this case, the most significant time bit (hours $2^4$) is transferred to the computer.

(29) SS5 advances to position 24. This connects the hours $2^3$, $2^2$, $2^1$, $2^0$, and minutes $2^5$ binary bits to the wipers of SS5K, J, I, H, and G.

(30) Repeat step 11 except that the next five bits of the digital clock time word are transferred to the computer.

(31) SS5 advances to position 25. This connects the minutes $2^4$, $2^3$, $2^2$, $2^1$, and $2^0$ binary bits to the wipers of SS5K, J, I, H, and G.

(32) Repeat step 11 except that the least significant five bits of the time word are transferred to the computer.

V7 grid, being tied to SS5E wiper, is grounded through SS4B. This energizes SS4 solenoid.

(33) SS5 advances to position 26 ending the sixth complete cycle of SS5. SS4 solenoid is de-energized advancing SS4 to position 32.

(Note that SS5 cannot home from position 22 on the sixth cycle of SS5 because the 31st contact of SS4A is not tied to SS5D, as are contacts 6–11–16–21–26.)

(34) SS5 advances to position 1 and continues through four more revolutions. This advances SS4 through the unused positions 33 through 52. (Note that CS–3 is now closed.) When SS4 arrives at position 52 and SS5 homes to position 26 at the end of the tenth revolution, SS4 off normal-1 and SS5 off normal-2 will both be closed. This biases V6 to cut off and stops further advance of SS5 and SS4. Since the inhibit scan signal was applied when the computer had received thirty data words plus the time signal, the sequencer operation will stop until the next scan start command is received. Also, when the inhibit scan signal is received, relay 13 is de-energized closing contacts 1 and 2. This energizes relay 11 through V4B and inhibits further transmission of data to the computer. This prevents the sequencer from interfering with other computer operations while the sequencer is scanning through its "spare" positions.

(35) Relay 12 is also inhibited when the inhibit scan signal is received. This prevents transmission of TPP pulses to the computer.

(36) Positions 7 through 25 on SS5B are wired to the SS5 homing circuit so that in the event SS5 should miss one or more advances during the revolution it will always home when SS4 reaches positions 6–11–16–21–26–37–42–47 or 52 via SS4A and SS4B.

(37) At the end of the scan SS4 off normal-2 returns to its normal position. This is necessary to advance SS4 from position 52 to position 1 at the start of the next scan.

Referring again to FIGURE 1, there is illustrated an apparatus disposed to receive electrical output signals of the computer. This apparatus is entitled "Controller" 232. This apparatus serves the function of receiving electrical signals from the output of the computer translating them into pneumatic signals suitable for adjusting pneumatic motor valves or other process control equipment. However, generally the controller is employed to adjust the set points of conventional pneumatic process controllers which in turn causes adjustments of conventional motor valves in the usual fashion. The controller, although not necessarily limited thereto, will be described as it is employed to adjust the set points of conventional pneumatic controllers. The apparatus of FIGURES 7 and 8 is directed to a means of translating the electrical output signals from the digital computer into suitable set point signals of a pneumatic nature. Of course, if it is desired to employ electrical controllers and electrical motor valves, the apparatus of FIGURES 7 and 8 would have the equivalent electrical translating mechanism and appropriate transmission means would be provided to operate therewith in effecting the resetting of the various process controllers.

The apparatus of FIGURES 7 and 8 derives a pair of signals from display devices, such as a pair of nixie tubes in the computer. The combination of these signals tells an associated motor which direction to run and how long to run. During the time that the drive motor operates, it adjusts a pneumatic flapper valve in a particular direction.

The signals appearing at the output of the computer are applied by their appropriate cables to the terminals in terminal block 600. These terminals are arranged in pairs and have respective diode switching circuits or the equivalent connected thereto in order to command the appropriate ones of various servomotors to operate. The pairs of terminals are: 601, 602; 603, 604; 605, 606. Thus, it is seen there are three pairs of terminals which respectively cooperate with each of the three process controllers. In diode switching circuits, 610 is connected to the terminal block. Such switching circuits are well known in the computer art and are described in Millman and Taub, "Pulse and Digital Circuits," published 1956 by McGraw-Hill Book Company (e.g., page 424). Diode 611a is connected between terminals 601 and that terminal of 612 that is not connected to 602. Diode 613a is connected in similar fashion between 603 and 614 as is 615a between 605 and 616. All diodes are polarized to pass a current when the terminal 601–606 is negative. Diodes 611, 613 and 615 are connected to a common lead 618 and to a common resistor 620 to the control grid of a triode 622. The output from tube 622 is connected by a lead 700 to the control grid of a second triode 624. This second triode can be termed a keyer tube because it operates a directional solenoid 626 to move a directional relay switch 628 to a position that dictates counterclockwise motion of the set point drive motors.

Each of the other pairs of terminals 601, 602, etc., is also connected to a particular selector triode which selects the individual servomotor that is to be operated. Thus, it is seen that the instant system provides a common directional relay 628 which is operated from any one of three terminals and that the individual motors to be operated are selected by other means which are now described.

Diodes 611a and 612 are connected through a common resistor 630 to a first selector triode 632, the anode of the latter being connected to the control grid of a keyer tube 634 which operates a motor selection relay 636 to make contact with switch 638 and thereby to select a drive motor 639 as the motor to operate and to drive a pneumatic pressure adjusting system. Diodes 613a and 614 are connected in a like manner through a resistor 640 to the control grid of a selector triode 642 and to a keyer tube 644 and a motor selector solenoid 646 and a relay switch 648 in order to select the set point control drive motor 649. A similar construction connects diode 615A and 616 through a resistor 650 to the grid of selector triode 652, thence to the control grid of a keyer tube 654, solenoid 656 and motor selector switch 658.

Each of the drive motors 639, 649, and 659 is connected by a conventional mechanical linkage to a pneumatic transmitter such as 671, 673 and 675, respectively. Each of these transmitters is connected between an air supply conduit 678 and a respective controller not herein illustrated. Details of a suitable pneumatic transmitter may be found in the Taylor Instrument Company Bulletin 490JF Transcope Recorder.

A positive power supply is connected through the respective solenoids to the anodes of all the keyer tubes discussed above. Appropriately, size resistors are provided between this power supply and the plates of the selector tubes. Grid bias resistors are connected between the control grids of each of the first discussed triodes 622, 632, 642 and 652 and the positive power supply. A negative power supply is connected through appropriate grid resistors to the control grids of the respective keyer tubes 624, 634, 644, and 654. Voltage regulation is provided by two gas-filled discharge tubes 686 and 688 which are connected between the poistive and both negative power supplies and ground, respectively. Connected in parallel with each of the discharge tubes is a condenser, denoted as 690 and 692, respectively. An A.C. power supply 695 is provided to their respective drive motors 639, 649 and 659.

Operation of the controller will now be described with respect to the channels through FIGURES 7 and 8 to begin with terminals 601 and 602, it being understood that the operation of the other two pairs of terminals and servomotors is of like nature. Additional pairs of terminals, selector tubes, and keyer tubes can be provided where required. The input signals are applied to only one pair of terminals at any one time. They are of one of two magnitudes, in the preferred embodiment two negative voltage levels representing "0" or "1" are used. The "0" (false) signals hold the drive motors at rest and hold the reversing relay de-energized. The "1" (true) signals cause the motors to run and energize the reversing delay. The proper pair of terminals to be fed signals is selected by the computer. The "0" signal can represent an increase in set point and the "1" signal can represent a decrease in set point as applied to terminals 601, 603 and 605. The signals on these three terminals, applied successively for each set point to be adjusted, determine the direction of the change in set point. The "0" isgnal applied to terminal 601, travels through diode 611 to the grid of triode 622, cuts off the keyer triode 624 and causes a direction relay 628 to remain in the CW position, shown to the right of FIGURE 8. This same action occurs from "0" signals appearing at any of the odd numbered terminals so that all of the drive motors are prepared for rotation in a particular direction. The "0" signal also travels through diode 611A to the triode 632 which cuts off the keyer tube 634 and causes the motor selector relays 638 to remain de-energized. When the digital computer calls for a set point change, a "1" signal appears at the selected even number terminal. This causes the selector set point motor to rotate for a period of time as dictated by the duration of the signal applied to terminals 601 and 602. This rotation is in a direction as selected by the potential terminals 601, 603, or 605.

In this manner, the operation of drive motors 639 adjust the pneumatic transmitter 671 to provide a set point change signal to the controller for the hydrocarbon feed stream. The transmitters 673 and 675 are adjusted sequentially in a similar manner to change a set point for their respective controllers as directed by the computer signals.

The closed loop control program of the digital computer calculates a drive motor running time and stores these running times as one of the above "0" or "1" signals for use in directing the drive motor operation. Another function that is carried out is to provide an output signal that equals the running time, i.e., a continuous pulse of the time base equal to the running time, by an iterative selective subtraction process.

Although the inventive method of and apparatus for collecting and transmitting data to a digital computer has been specifically described as applied to the control of a thermal cracking furnace utilizing a particular type of computer, it is not intended to limit this invention thereto. The inventive method is applicable to the assembly of any data in analog form representative of measurable quantities, the conversion of said data to digital form, and the transmission of said converted data to a digital computer.

As will be evident to those skilled in the art, various modifications of this invention can be made, or followed, in the light of the foregoing disclosure and discussion without departing from the spirit or scope thereof.

I claim:

1. Apparatus comprising, in combination, means of measuring a plurality of separately measurable quantities, means of zero suppressing in sequence signals representative of each of said measurable quantities, means for transmitting in sequence signals representative of each of said measurable quantities from said means of measuring to said means of zero suppressing, means of amplifying in sequence the resulting zero suppressed electrical signals, means of converting into digital form the resulting amplified electrical signals, means of transmitting in sequence to a digital computer the resulting converted electrical signals, and means of transmitting to said computer the time of day of measuring of each of said quantities.

2. The apparatus of claim 1 wherein said means of transmitting to said computer the time of day of measuring of each of said quantities comprises means of counting and converting into digital form electrical signal pulses transmitted to said counting and converting means at a constant rate, means for transmitting electrical signal pulses at a constant rate to said means for counting and converting, means of transmitting said counted and converted signal pulses to said digital computing means, means of passing an inhibit signal from said digital computing means to said counting and converting means during said transmission of said counted and converted signal pulses, means of storing said electrical signal pulses during the transmission of said counted and converted signal pulses, and means of transmitting said stored electrical signal pulses from said storage means to said counting and converting means.

3. Apparatus comprising, in combination, a means of counting and converting into digital form electrical signal pulses transmitted to said counting and converting means to indicate the time of day at which an input variable was measured at a constant rate, means for transmitting electrical signal pulses at a constant rate to said means for counting and converting, means of transmitting said counted and converted signal pulses to a digital computing means, means of passing an inhibit signal from said digital computing means during said transmission of said signal pulses to said counting and converting means, means of storing said electrical signal pulses during said transmission of said counted and converted signal pulses, and means for transmitting said stored electrical signal pulses from said storage means to said counting and converting means.

4. The apparatus of claim 2 wherein said means of zero suppressing in sequence electrical signals representative of each of said measurable quantities comprises means adapted to receive in sequence positive electrical signals representative of said measurable quantities, means of passing each of said electrical signals in sequence through a voltage-dividing circuit, each of said voltage-dividing circuit comprising means of setting the lower end of said electrical signals at the zero level, and means of filtering each of said zero suppressed signals.

5. The apparatus of claim 2 wherein means of transmitting in sequence to a digital computing zone said converted electrical signals comprises a scan rate timing means, means of transmitting a start signal pulse from said computing means to said scan rate timing means, means of separately scanning each of said measurable quantities, means of transmitting a start signal pulse from said scan rate timing means to said means of separately scanning each of said measurable quantities, means of transmitting a start conversion signal pulse from said scan rate timing means, means of transmitting converted electrical signals to said computing means, and means of transmitting a signal pulse from said scanning means to said scan rate timing means at the completion of the scanning operation.

References Cited by the Examiner

UNITED STATES PATENTS

| 2,987,704 | 6/1961 | Gimpel et al. | 340—172.5 |
| 3,000,003 | 9/1961 | Einsel | 340—172.5 |
| 3,018,959 | 1/1962 | Thomas | 235—167 |
| 3,020,490 | 2/1962 | Kleiss | 235—151 |
| 3,061,192 | 10/1962 | Terzian | 340—172.5 |
| 3,064,239 | 11/1962 | Svigals | 340—172.5 |
| 3,064,247 | 11/1962 | Lang | 235—154 |

OTHER REFERENCES

Pages 15–28, 1957, "Electronic Designers' Handbook," Landee et al., McGraw-Hill, New York.

1959, Digital and Sampled-data Control Systems, Julius Tou, McGraw-Hill, New York.

ROBERT C. BAILEY, *Primary Examiner.*

MALCOLM A. MORRISON, *Examiner.*

I. S. KAVRUKOV, *Assistant Examiner.*